Feb. 1, 1949. J. F. APPLETON 2,460,616
GRASS CATCHING ATTACHMENT FOR SHEARS
Filed March 10, 1944
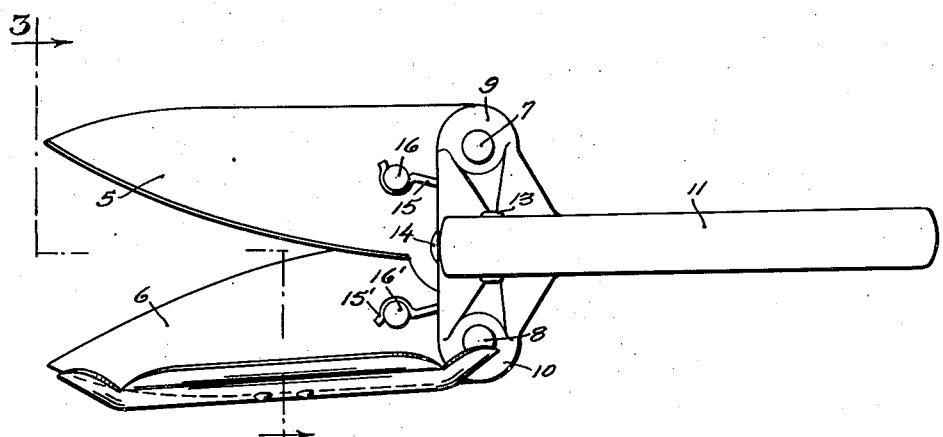
Fig. 1.
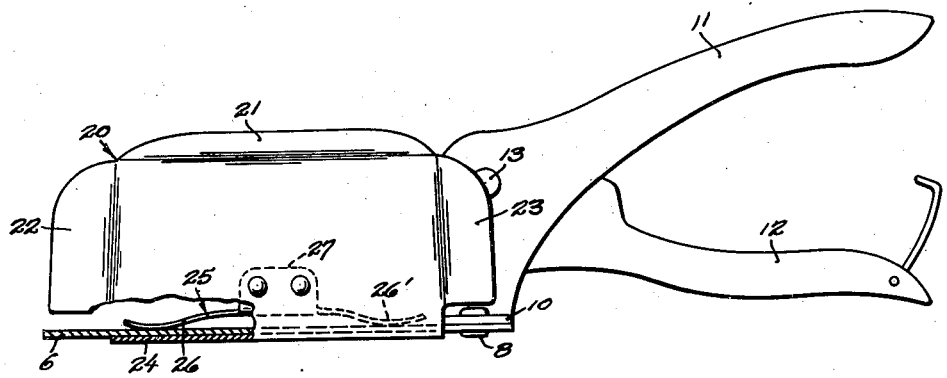
Fig. 2.
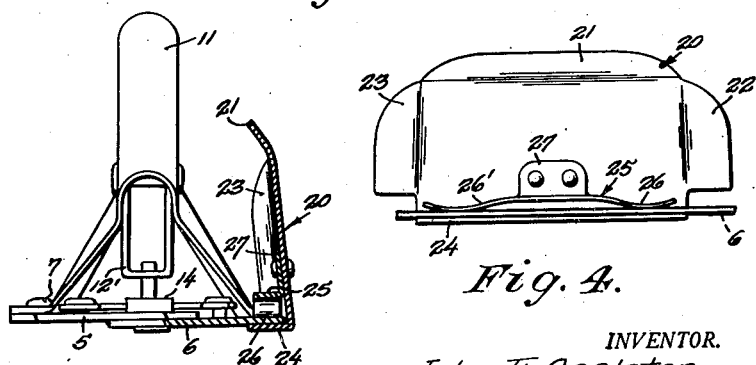
Fig. 3.
Fig. 4.
INVENTOR.
John F. Appleton Patented Feb. 1, 1949

2,460,616

UNITED STATES PATENT OFFICE 2,460,616

GRASS-CATCHING ATTACHMENT FOR SHEARS

John F. Appleton, Seattle, Wash.

Application March 10, 1944, Serial No. 525,931

2 Claims. (Cl. 56—202)

This invention relates to grass or pruning shears, and has particular reference to a device arranged and adapted to be applied as an attachment therefor and which functions to catch cuttings as the latter are clipped from grass, shrubs, hedges and the like in the use of the shears.

The object of the invention is to provide a device for the above purpose which admits of being detachably applied upon either side of a standard pair of shears, selectively, to thus accommodate either a right or left hand cutting operation, which is so designed as not to present any obstruction which would tend to hamper the operator in his use of the shears, and which otherwise introduces numerous advantages in the way of structural simplicity, convenience and efficiency, all of which will appear and be understood in the course of the following detailed description and claims, the invention consisting in the novel construction and in the adaptation and combination of parts hereinafter described and claimed.

In the accompanying drawing:

Figure 1 is a plan view representing a standard pair of grass shears, one of many types of shears used for general gardening work to which the present invention adapts itself, and illustrating a cutting-catcher attachment embodying the teachings of my said invention applied thereto.

Fig. 2 is a side elevational view thereof with parts broken away and shown in longitudinal vertical section.

Fig. 3 is a view partly in transverse vertical section and partly in end elevation, as indicated by the section line 3—3 of Fig. 1; and Fig. 4 is a fragmentary side elevational view looking at the cutting-catcher from the side opposite that in which it is viewed in Fig. 2, and with the scale being reduced from the scale employed in the preceding views.

For purposes of illustration, I have elected to show my attachment as being applied to that type of pruning implement customarily catalogued as "grass shears," namely that character of shears in which the two shearing blades, indicated by the numerals 5 and 6, are pivoted as at 7 and 8 to oppositely extending wing elements 9 and 10 projected laterally from a supporting handle 11, the handle being stationary as respects the plane of the blades and extending rearwardly in the nature of a bill from the pivoted rear ends of the latter. Below the handle and pivoted as at 13 thereto for movement about an axis at right angles to the pivotal axes of the blades is an actuating lever 12 connecting from its nose 12' with a longitudinally movable cross-head 14 which in turn finds crank connection with the root ends of the two blades. Springs 15—15' exert their force against blade-anchored pins 16—16' and in opposition to the contractive influence of the lever to normally urge the blades outwardly.

According to the present invention there is provided a plate 20 of a generally rectangular plan configuration and which, by preference, is given a length approximating that of the blades. This plate is flanged about each of its four sides with one of said flanges, that of a longer side and denoted by 24, being bent to an angle of approximately 90° from the plane of the plate proper, and the other three flanges, as 21, 22 and 23, being bent in a like direction but to a somewhat lesser angle. The said flanges 21—22—23, and as will be understood from an inspection of the drawing, serve as guard lips. The other and sharply bent flange 24 is designed to operate as a sustaining ledge which, in the application of the attachment to the shears, bears against the underside of a selected one of the two shearing blades along the back edge of the latter. There is provided as a complement to this ledge a leaf spring denoted generally by 25 and which I rivet or otherwise fixedly attach to the plate in a position causing the spring to bear upon the upper face of the selected blade for gripping the latter between the spring and the ledge, this spring, in more particularity, providing a central anchoring tab 27 and having a pair of spring arms 26—26' extending longitudinally therefrom in overlying relation to the ledge and—in the absence of the shearing blade—bearing upon the latter. To facilitate the insertion of the back edge of the blade between the ledge and the spring, the free extremities of the two arms 26—26' are bent upwardly to present flaring lead-in throats.

The manner of the attachment's usage is believed to be clear, being one in which the device may be applied to either of the two blades due to its reversible nature. The cuttings are very effectively caught by the plate which, in the use of the shears, extends more or less horizontally and in the nature of a shelf from the lower edge limit of the shears. The user, at necessary intervals, deposits the cuttings in a receiving container by flipping the same off the shelf and into the container—say a cardboard carton—which is placed in a position convenient to the work and moved along as the worw progresses.

It is not my intention that any limitations be implied by reason of having expressly referred to the plate as one which produces a horizontal shelf. The plate works to the accomplishment of its intended end when the shears are held in various positions as long as the said plate is below the point of the cutting operation.

What I claim is:

1. As an attachment for grass or pruning shears to catch cuttings delivered therefrom: a plate having one edge turned inwardly to define a flange lying at an angle of approximately 90° from the plane occupied by the plate proper, said flange acting as a sustaining ledge arranged, in applying the attachment to a blade of the shears, to bear upon one face of the blade along the outer margin of the latter; and a leaf-spring attached centrally of its length to the plate and presenting spring arms extending lengthwise of the plate therefrom into such overlying relation to the flange as, upon application of the attachment to the blade, to resiliently grip the other face of that part of the blade sustained on the ledge.

2. The attachment device of claim 1 wherein the leaf-spring is of a bowed form causing the spring to bear only by its two ends upon the blade, and having the extremities of each of said bearing ends lipped upwardly.

JOHN F. APPLETON.

REFERENCES CITED

The following references are of record in the file of this patent:

UNITED STATES PATENTS

| Number | Name | Date |
|---|---|---|
| 1,338,873 | Scott | May 4, 1920 |
| 1,879,488 | Rauh | Sept. 27, 1932 |

FOREIGN PATENTS

| Number | Country | Date |
|---|---|---|
| 13,310 | Great Britain | May 23, 1907 |